(No Model.)
W. A. C. OAKS.
FORK FOR FRUIT PARING MACHINES.
No. 382,549. Patented May 8, 1888.
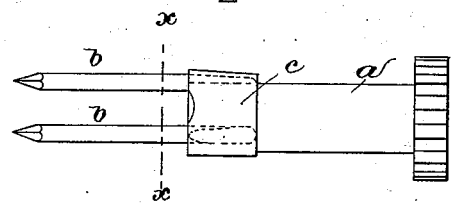
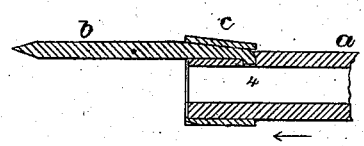
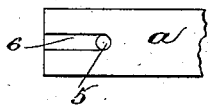
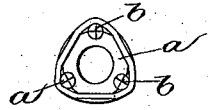
Witnesses.
Edgar A. Goddin.
Frederick L. Emery.
Inventor.
William A. C. Oaks.
By Crosby & Gregory. attys.

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

FORK FOR FRUIT-PARING MACHINES.

SPECIFICATION forming part of Letters Patent No. 382,549, dated May 8, 1888.

Application filed March 16, 1888. Serial No. 267,417. (No model.)

*To all whom it may concern:*

Be it known that I, WILLIAM A. C. OAKS, of Antrim, in the county of Hillsborough and State of New Hampshire, have invented an Improvement in Forks for Fruit-Paring Machines, of which the following description, in connection with the accompanying drawings, is a specification, like letters on the drawings representing like parts.

Heretofore the three prongs forming the fork of fruit-paring machines have been cast together as a single piece from malleable iron or brass; but such forks are objectionable, for when of cast metal and made small enough to be used practically they are weak and fail to stand hard usage. So, also, forks have been made with steel tines united to a hub of iron by casting; but a fork so constructed cannot be made small enough, for the tines cannot be put sufficiently close together so as to leave a small core. So, also, prior to my invention as herein contained, a fruit-fork adapted especially for use in machines for paring peaches has had spring tines curved in the direction of their length and composed of sheet metal of concavo-convex shape in cross-section, and said tines have been held to a fork-shaft by a clamp, as in United States Patent No. 315,158, heretofore granted to me.

It is a great desideratum to make the fork as strong as possible and at the same time take up as little space as possible at the center of the apple, for the smaller the space occupied by the tines of the fork the smaller the core and the less the waste of the fruit, and at the same time the tines must be so held as to be independently detachable from the fork-shaft and be restrained from any independent side motion or longitudinal motion with relation to the fork-shaft.

In my experiments to improve the forks of fruit-paring machines I have produced a fork having straight steel tines composed of wire, the said tines being detachably secured to the fork-shaft, so that when a tine is bent or broken it may be readily removed and another one put in its place. As shown, these tines are each provided at its inner end with a lug or projection, which enters a recess at or near the front end of the shaft of the fruit-fork, and the said tines near their inner ends and near the said lugs enter grooves, which prevent any side motion of the tines with relation to the fork-shaft, the depth of the said grooves also being such as to permit the tines to be brought closely to the center of rotation of the said shaft.

Figure 1 in elevation shows a fork-shaft of a fruit-paring machine with my improved fork added; Fig. 2, a longitudinal section of Fig. 1, the right-hand end of the shaft being broken off. Fig. 3 shows the end of the shaft with the tines omitted; and Fig. 4, a section in the line $x$, Fig. 1, looking to the right.

The shaft $a$ is and may be of any usual construction common to fruit-paring machines, the shaft being shown hollow for use in that class of machines wherein the core is to be pushed off of the fork by a central push-off rod. The steel tines $b$, formed preferably from steel wire and pointed at their outer ends, are bent at their inner ends in suitable direction to form lugs or projections, as 4, to enter a suitable recess, 5, at or near the end of the shaft. The end of the shaft $a$ is also provided with longitudinal grooves, as 6, (see Fig. 4,) to receive portions of the tines next the bent portions 4, the said grooves retaining the tines and preventing any side motion thereof, while the lugs or projections 4 prevent any longitudinal motion of the tines with relation to the shaft $a$. These grooves are made as deep as possible, so as to permit the tines to be brought as closely as possible to the axis of rotation of the shaft $a$, in order to bring the tines into the least possible compass, thereby wasting the smallest possible core.

The rear ends of the tines are beveled, as best shown by one tine in Fig. 2, and these tines are held in place by means of a ferrule, as $c$, which is driven upon them in the direction of the arrow, Fig. 2, the said ferrule being driven upon the tines until the front end of the ferrule projects beyond the end of the shaft, when the front end of the said ferrule, it being composed, preferably, of soft brass, is struck between the tines and its end is battered down, to thus lock the ferrule in place against rotation or longitudinal movement backward upon the shaft.

When for any reason a tine is broken, the ferrule may be subjected to a pressure of sufficient strength to force it backward upon the tines, the front portion of the ferrule previously bent inward, as described, being by the pressure bent outwardly.

I claim—

1. The improved fork for fruit-paring machines, it comprehending a shaft, a series of independent steel tines provided with lugs or projections at their inner ends, and a ferrule, the lugs or projections of the tines entering recesses and a portion of the tines near the said lugs entering grooves at or near the end of the fork-shaft, the ferrule retaining the tines in the said recesses and grooves, substantially as described.

2. The fork-shaft, the independent tines provided at their inner ends with lugs or projections, as 4, and tapered or inclined, as described, combined with a ferrule driven upon the said tines and shaft and bent at its end, to lock the ferrule in place against longitudinal movement, substantially as described.

In testimony whereof I have signed my name to this specification in the presence of two subscribing witnesses.

WILLIAM A. C. OAKS.

Witnesses:
EMMA S. McCOY,
H. A. HURLIN.